(12) United States Patent
Schütte et al.

(10) Patent No.: US 11,772,407 B2
(45) Date of Patent: Oct. 3, 2023

(54) METHOD FOR ENCODING A PACKAGING CONTAINER, AND ENCODED PACKAGING CONTAINER FOR CONSUMER GOODS

(71) Applicant: PACCOR Packaging GmbH, Düsseldorf (DE)

(72) Inventors: Andreas Schütte, Meerbusch (DE); Helmut Ruland, Elsdorf (DE); Nicolas Lorenz, Starnberg (DE)

(73) Assignee: PACCOR Packaging GmbH, Düsseldorf (DE)

( * ) Notice: Subject to any disclaimer, the term of this patent is extended or adjusted under 35 U.S.C. 154(b) by 0 days.

(21) Appl. No.: 17/483,796

(22) Filed: Sep. 23, 2021

(65) Prior Publication Data

US 2022/0097436 A1 Mar. 31, 2022

(30) Foreign Application Priority Data

Sep. 28, 2020 (DE) ...................... 10 2020 125 214.5

(51) Int. Cl.
*G06K 19/06* (2006.01)
*B42D 25/333* (2014.01)
(Continued)

(52) U.S. Cl.
CPC ............ *B42D 25/333* (2014.10); *B29C 51/08* (2013.01); *B29C 51/265* (2013.01);
(Continued)

(58) Field of Classification Search
CPC .............................. B29C 51/08; B29C 51/265; G06K 19/06037; G06K 19/06159; B42D 25/324
(Continued)

(56) References Cited

U.S. PATENT DOCUMENTS 5,366,791 A * 11/1994 Carr ..................... B65D 25/205
156/60
2005/0067727 A1 3/2005 Weder
(Continued)

FOREIGN PATENT DOCUMENTS

DE 195 44 973 6/1997
DE 10 2010 023 098 12/2011
(Continued)

OTHER PUBLICATIONS

Extended European Search Report dated Feb. 2, 2022, in European Patent Application No. 21192407.1, 6 pages.
(Continued)

*Primary Examiner* — Paultep Savusdiphol
(74) *Attorney, Agent, or Firm* — Lowe Graham Jones PLLC

(57) ABSTRACT

The invention relates to a method for encoding a dimensionally stable packaging container or an associated constituent made of plastics material, wherein the packaging container is suitable for storing consumer goods such as food, detergents, etc., wherein a film-shaped, flat plastics material for forming the three-dimensional packaging container or the associated constituent is deep-drawn using a tool mold while, at a plurality of positions, the outer sides or the inner sides thereof undergo a first shape-changing treatment acting on the first surface thereof for producing a plurality of three-dimensional codes.

11 Claims, 4 Drawing Sheets

(51) Int. Cl.
*B42D 25/324* (2014.01)
*B42D 25/435* (2014.01)
*B29C 51/08* (2006.01)
*B29C 51/26* (2006.01)

(52) U.S. Cl.
CPC ......... *B42D 25/324* (2014.10); *B42D 25/435* (2014.10); *G06K 19/06037* (2013.01); *G06K 19/06159* (2013.01)

(58) Field of Classification Search
USPC .......................................................... 235/490
See application file for complete search history.

(56) References Cited

U.S. PATENT DOCUMENTS

| | | | | |
|---|---|---|---|---|
| 2008/0302256 | A1* | 12/2008 | Hirz | B41M 5/38207 101/32 |
| 2013/0129872 | A1* | 5/2013 | Kruger | A47J 31/3638 426/115 |
| 2014/0315153 | A1* | 10/2014 | Kitching | B29C 33/3842 433/213 |
| 2016/0070999 | A1* | 3/2016 | Pranov | G06K 19/06037 235/494 |
| 2016/0339495 | A1* | 11/2016 | Zeh | B05D 3/0254 |
| 2019/0060976 | A1* | 2/2019 | Krätzig | B21D 51/26 |
| 2019/0306385 | A1* | 10/2019 | Sharma | B42D 25/324 |
| 2021/0001377 | A1* | 1/2021 | Sutton | B07C 5/342 |
| 2021/0101711 | A1* | 4/2021 | Brown | B29C 49/46 |
| 2022/0027590 | A1* | 1/2022 | Sharma | H04N 21/23892 |

FOREIGN PATENT DOCUMENTS

| | | |
|---|---|---|
| DE | 10 2011 082 011 | 3/2013 |
| DE | 202018107348 U1 | 2/2019 |
| EP | 0 868 357 | 11/1999 |
| EP | 3 305 498 | 4/2018 |
| WO | 2021/167971 | 8/2021 |
| WO | WO-2022058588 A1 * | 3/2022 ............... B65D 1/40 |

OTHER PUBLICATIONS

Extended European Search Report dated Feb. 7, 2022, in European Patent Application No. 21192410.5, 7 pages.
Examination Search Report dated Oct. 14, 2022, in Canadian Patent Application No. 3128618, 6 pages.

* cited by examiner

METHOD FOR ENCODING A PACKAGING CONTAINER, AND ENCODED PACKAGING CONTAINER FOR CONSUMER GOODS

PRIORITY CLAIM

This application claims the benefit of priority from Germany Patent Application No. 10 2020 125 214.5 filed Sep. 28, 2020, the contents of which is incorporated herein by reference.

FIELD OF THE INVENTION

The invention relates to a method for encoding a packaging container or an associated constituent made of dimensionally stable plastics material, which advantageously is suitable and provided for storing consumer goods, such as food, as well as to a packaging container made of dimensionally stable plastics material, which is provided for storing food.

BACKGROUND OF THE INVENTION

Methods for producing packaging containers from rigid plastics material for the food industry are known in many ways. For example, the publications EP 0868357 A1 or DE 19544973 A1 can be mentioned in this case. These production methods are generally characterized in that packaging containers of this type are formed in a deep-drawing method in such a way that a flat plastics material is placed as a film-shaped element over a mold and then drawn into this mold during a deep-drawing process. For this purpose, both vacuum devices can generate a vacuum on the underside of the film-shaped element within the mold, and deep-drawing punches acting from above can be used. Methods of this type are used to produce a large number of packaging containers for the food industry in a series production with a high throughput, associated lid elements being produced in a separate method.

Deep-drawing methods of this type have the disadvantage that when drawing a middle portion of the film-shaped plastics material into the tool mold, a deformation process takes place in the edge region, i.e. at the transition between the future bottom surface of the packaging container and the lateral wall elements. This deformation process often results in deformation in the edge region at the transition between the bottom surface and the wall elements by up to 90°, in which case a crease-free and smooth deformation should be provided. Due to the material used in each case and the use of a negative or positive tool mold made of durable material, such as metal, there is therefore the risk of a surface change in the region of the future lateral wall element of the packaging container which is used, for example, for serving ready-made salads, cold ready-made meals, vegetable compositions, etc. These are often provided with a label or other imprints on their surface.

As a result, plastics materials of this type are not printed or provided with stickers before the actual deep-drawing process—although it would be very easy at this point in time. This is true, in particular, for stickers that have a code. Encodings in particular, such as barcodes, must therefore be attached to the packaging container subsequently, i.e. after deep drawing, by means of a separate sticker or using a paper band surrounding the packaging container, which is generally more complex because the lateral walls are already in the final alignment position thereof and, as a result, application is made more difficult. However, encodings or barcodes of this type are highly desirable in order to allow fast payment by reading out the barcodes. In addition, barcodes of this type can generally only be found at a specific position for the entire packaging container containing the dish and the associated lid, so that the cashier first has to find this position and then hold it under the barcode scanner. For this purpose, it may also be necessary to tilt the dish or meal together with the packaging container. Generally, this is not desired. In addition, applied barcodes in the form of stickers, labels or banderols can make identification more difficult and/or impossible due to deformation and tearing.

In addition, packaging containers of this type made of plastics materials are increasingly posing an environmental problem, since they are often not subject to a specific recycling cycle. Depending on the respective country and the associated environmental regulations, in particular waste recycling regulations, containers of this type may therefore still find their way into a practiced waste separation, but not into a regulated recycling cycle in which this material, from which the packaging container is made, is in each case specifically assigned by the manufacturing company to a recycling process for the creation of new containers. Examples of rigid or stiff plastics materials of this type are HDPE, PE, PET and PP.

Another disadvantage in the case of the encoding of packaging containers in the previous form is that when stickers are used to apply a barcode, these can be pasted over or even exchanged. This is also not desirable, since a price and other data cannot be quickly read out from this encoding and there may be a case of fraud when barcodes of this type are exchanged.

Thus, the object of the invention is to provide a method for producing and for encoding packaging containers or an associated constituent made of dimensionally stable plastics materials for consumer goods—in particular for food storage—as well as a packaging container or an associated constituent of this type in which the packaging container already becomes an information carrier during production, the information of which can be read out quickly and easily, specifically for return to a recycling cycle and without the use of additional application or attachment aids.

SUMMARY OF THE INVENTION

This object is achieved on the method side by the features of claim 1 and on the product side by the features of claim 10.

A substantial point of the invention is that, in the case of a method for encoding a packaging container or an associated constituent made of dimensionally stable plastics material, wherein the packaging container is suitable for storing consumer goods such as food, detergents, etc., the film-shaped plastics material undergoes shape-changing treatment for producing a plurality of codes, while it is deep-drawn using a tool mold. In this way, since the tool mold has correspondingly prepared inserts on the inner side and on the bottom region of the surface when a negative shape is present, each shape-changing treatment can be effected on the outer side of the plastics material during deep drawing in the form of an applied code, in particular a digital watermark, the existence of which is almost invisible to the viewer, namely in any number of and at many positions on the outside of the packaging container or an associated constituent. A previously plate-shaped or film-shaped, flat plastics material does not have any imprints or stickers before the actual deep-drawing process takes place, as these would undergo damage during the deep-drawing process due to the downward drawing and a deformation that takes place in the edge region at the transition between the bottom surface and the wall elements by up to 90° and thus cannot remain permanently undamaged on the outer side of the packaging container. Rather, during the deep-drawing, the packaging container is not only formed in the final shape thereof, but is also provided with the aforementioned plurality of codes by means of a single deep-drawing process.

During the actual deep-drawing process, the shape-changing treatment, which does not resemble a printing process, is carried out at various positions on the surface of a first side of the plastics material, which was previously plate-shaped or film-shaped and flat, i.e. on first surfaces of the outer sides of the three-dimensional packaging container to be formed. This ensures that there is no risk of damage to the printing surface while the deep-drawing process takes place, as is the case with printed surfaces. It goes without saying that the shape-changing treatments can also take place on the surfaces of the inner sides of a three-dimensional packaging container to be formed or of associated constituents, such as a lid. This takes place when a positive mold is used as the tool mold instead of a negative mold. As a result, the codes or the plurality of codes are/is then introduced into the surfaces of the inner sides of the three-dimensional packaging container or the associated constituent thereof, such as a lid, by means of a deep-drawing process over a positive mold.

A preceding method step which is substantial for this purpose includes the conversion of data from at least one previously stored two-dimensional code pattern into data of a three-dimensional code pattern by means of a data conversion device. This three-dimensional code pattern is incorporated into the second surfaces of the tool mold or mold inserts that can be arranged therein by means of a laser device. In this second shape-changing treatment, the second surfaces receive surface depressions and/or elevations in the form of tiny dots or other tiny cross-sectional areas.

As an alternative to the laser device, any other non-contact processing method can be used that ultimately achieves a shape-changing treatment on the surfaces of outer surfaces or inner surfaces of the three-dimensional packaging container or the associated constituents thereof, in that the reprocessing of the tool mold or associated inserts takes place.

Accordingly, data from, for example, a two-dimensional barcode, a digital watermark and/or a QR code are converted in such a way that they can be represented in three-dimensional space in order to form corresponding depressions and elevations at the points where previously light and dark area portions of the code were provided in the two-dimensional code pattern. This means, for example, that a dark point in a two-dimensional code pattern within a lateral inner wall or a bottom surface of the tool mold represents a specific depression in the form of a point, whereas a light point of the two-dimensional code pattern represents an elevation or a surface region without a depression in the three-dimensional code pattern on the second surfaces of the outer sides or the lateral wall surfaces or the bottom surface of the tool mold.

A necessary ablation, or melting or engraving of the tiny code patterns in the surface of the inner surfaces of the tool mold, which are generally made of metal, or in correspondingly inserted inserts, which are usually also made of metal, takes place by means of a laser device having one or more laser beams. These laser beams can heat the surfaces at specific points in such a way and, if necessary, carry out an ablation, in particular a melting process, and generate code patterns in a very small space, for example in a square shape, as known from QR codes, on the second surfaces in three-dimensional form. In a subsequent deep-drawing process, the rigid or dimensionally stable or stiff plastics material is pressed against these regions of the tool mold or the inserts thereof in such a way that the pattern of the three-dimensional code is imprinted in the plastics material on the outer side of the packaging container and is provided, due to the multiple use, at various positions on the outer side of the packaging container. A treatment of this type of the surface inner sides of the tool mold by means of laser beams is not easy to practice and carry out since there is the risk of causing undesirable elevations in the edge regions of the, for example, hole-like depressions, the shape of which is desired to be that way in laser treatments of this type. However, long series of tests by the applicant have shown solutions as to how elevations and depressions of this type can be processed in order to achieve a constant result in the deep-drawing process and the resulting encoding in the long term.

The deep-drawing process can be supported, for example, by underpressure or punches, or even overpressure, in order to ensure the fastest possible reshaping of a film-shaped, flat plastics material into a final shape of the actual shell of the packaging container or an associated constituent.

The code can be applied in identical form as often as required on the wall and bottom sides of the packaging container or an associated constituent in order to thereby distribute the code over the future lateral wall elements or outer wall surfaces or on the first surfaces of the outer sides of the packaging container and also the outer bottom surface. This ensures that the packaging container can be read out quickly and easily from any side, as is necessary, for example, when paying at the cash register. This saves time, as there is no tedious search for a barcode on a packaging sticker.

When using digital watermarks that are attached on the container, invisibly or almost invisibly or also visibly to the viewer, it can also be ensured that there is no forgery of a barcode or barcode information since the digital watermark as such is not immediately perceptible. However, digital watermarks of this type can be easily read out by conventional readers. In particular, it should be emphasized in this case that readout devices that operate and read two-dimensionally are able to read the three-dimensional code applied according to the invention on the outer side of the packaging container.

To read out the data of the digital watermark, associated data must be stored, for example in a cloud.

To improve the invisibility of the digital watermark, the code pattern applied to the packaging container can be optimized in terms of the resolution and the extent or the extension thereof with regard to the elevations that arise from the depressions of the tool mold or the tool mold inserts in such a way that it is to a certain extent integrated or disappears into the surface roughness of the surface of the outer surfaces of the packaging container, which roughness is provided in any case, and thus becomes invisible. The areal extent of the digital watermark over the entire outer surface, for example a lateral wall surface of the packaging container or a bottom surface, is also advantageous in this case, so that no difference can be seen from a non-encoded outer surface of the packaging container. Attaching a digital watermark is also conceivable in the corner regions of the packaging container. The rectangular code pattern can thus be digitally adapted or patched to a packaging container contour. The code pattern is thus distorted depending on the geometry of the packaging container contour, in that it is adapted to the contour. This can take place in terms of data technology, in that 3-D data of the packaging container are used, the corresponding distortion of the rectangular code pattern for transferring to parts or the entirety of the packaging container being used together therewith in order to adapt to the contour thereof during the data calculation. Thus, during the conversion of the data of a 2-D code into a 3-D code pattern, a type of three-dimensional texture is obtained.

In other words, first a conversion of data of a two-dimensional code pattern into data of a three-dimensional code pattern takes place and then, during a read-out process, if this is desired, for example as part of a recycling process, a conversion of a three-dimensional code pattern into data of a two-dimensional code pattern is carried out again. These data can then in turn be used to effect, for example, a targeted sorting of these containers with the specific material and the specific manufacturer on a sorting belt, or to separate or sort food packaging materials from non-food packaging materials.

This can even be achieved successfully if the container has already been crumpled or destroyed since, due to the large number of codes applied to the outer side of the packaging container in many different positions, it is almost always possible to successfully carry out a reading process and a conversion into data of a two-dimensional code pattern. This means that selected containers from a specific manufacturer and with a specific material can be used for producing high-quality recycled material.

The use of digital watermarks thus makes it possible that—even if the packaging container ends up destroyed in the waste after a meal—due to the distribution thereof across the packaging container and the permanent introduction thereof into the packaging container material, i.e. into the rigid plastics material, a recognition for the subsequent recycling process is possible. In this case, both the material, such as PP, PE, PET, rPET, etc., as well as the origin, the place of production, the production method, the packaging container content information, the GTIN number, the SKU number, etc. can be read out in order to subject and deliver the packaging container to a specific recycling cycle, for example, so that new containers can then be made from the recycling material using exactly this substance. Thus, readable data contained in the watermark can be used to identify the material and the packaging container or the constituents thereof per se to be categorized and sorted accordingly in the recycling method. The data, which can be found in the watermark in the form of a read-out process, allow conclusions to be drawn about the company that brought the packaging containers into circulation, which waste company was involved, who was involved in the recycling process, which sorting unit was actively involved and which control bodies were involved during the recycling process, the production process and/or the filling process of the packaging container.

In addition, the use of digital watermarks can give the buyer or the user information about the packaging content and other data on the food manufacturer by simply scanning or reading out a portion of the wall surface of the packaging container or the bottom using his/her smartphone.

The already mentioned depressions in the tool mold or the surfaces of inserts which are inserted into a tool mold of this type and which arise in the second shape-changing treatment are designed as the elevations which arise in the first shape-changing treatment. In this way, by means of a negative form effect, the three-dimensional code pattern is transferred to the outer surfaces of the packaging container in multiple forms and possibly in an identical form.

The positions of the plurality of codes are preferably selected in such a way that they are distributed on the outer wall surfaces and/or on an outer bottom surface of the deep-drawn packaging container. The digital watermarks are made up of square arrangements of small dots, it being possible for the square arrangements to be present in different sizes on the same packaging container. It goes without saying that digital watermarks of this type can have any other type of shape, such as the shape of a circle, a triangle or a rectangle without equal side lengths.

A packaging container made of dimensionally stable plastics material, which is suitable for storing food, accordingly advantageously has wall surfaces and/or a bottom surface having a plurality of digital watermarks which are almost invisible to the viewer. This takes place at a plurality of positions by means of a shape-changing treatment during a deep-drawing process without delay in the overall process sequence for producing the packaging container.

Another decisive factor for the recognizability of a digital watermark on the surface of the outer surfaces of the packaging container is the resolution of the two-dimensional signal data provided for conversion into 3-D data, so that more or less precisely outlined elevations are created on the outer surfaces of the packaging container.

Further advantageous embodiments result from the dependent claims. A preferred embodiment is described below in conjunction with the drawings.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
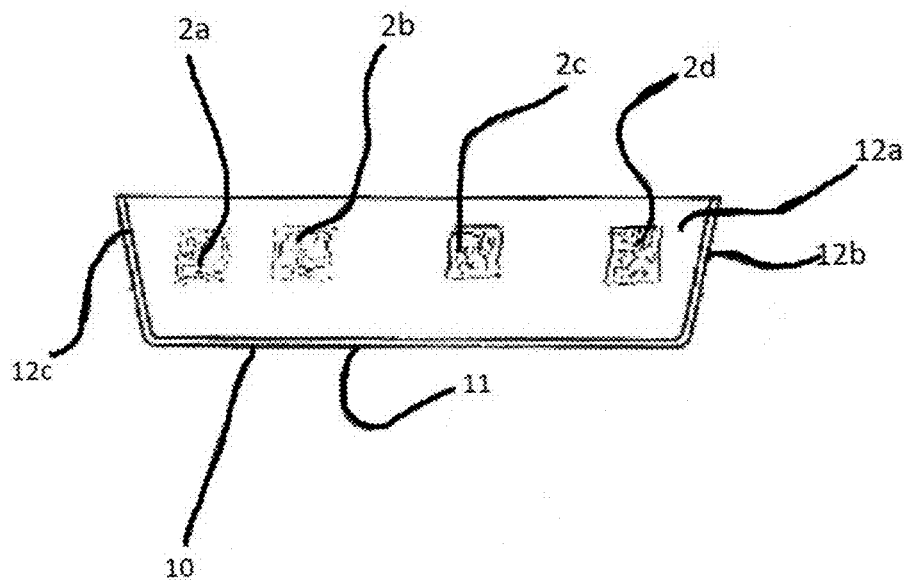
FIG. 1 is a lateral view of the finished packaging container having the encoding according to the invention.

FIG. 1 is a lateral view of a finished packaging container 10 which is still open in the upper region and could be covered with a lid. This view clearly shows that the almost invisible watermarks 2a, 2b, 2c and 2d are arranged on a lateral front wall surface 12a, or on the outside outer surface.

Further watermarks that cannot be shown in this case are arranged on the right and left lateral wall surfaces 12b and 12c. This also applies to a rear wall surface, which cannot be shown in this case. Watermarks are also arranged on the outside on a bottom surface 11 of the packaging container 10. These correspond to the watermarks 3a, 3b, as shown, for example, in FIG. 2, which represents the photograph of an actually produced plastics material container or packaging container. These square digital watermarks 3a and 3b can be arranged either twice or four times or also in multiple form on the bottom region or on the outer side of the bottom surface. In this way, reliable, targeted and fast scanning of information from the container is possible.

It can thus be clearly seen from this view in accordance with FIG. 1 that, due to the good distribution of all the digital watermarks, which can have different spacings, it is possible to read out information from any position. This can take place quickly and easily.

Figure 2:
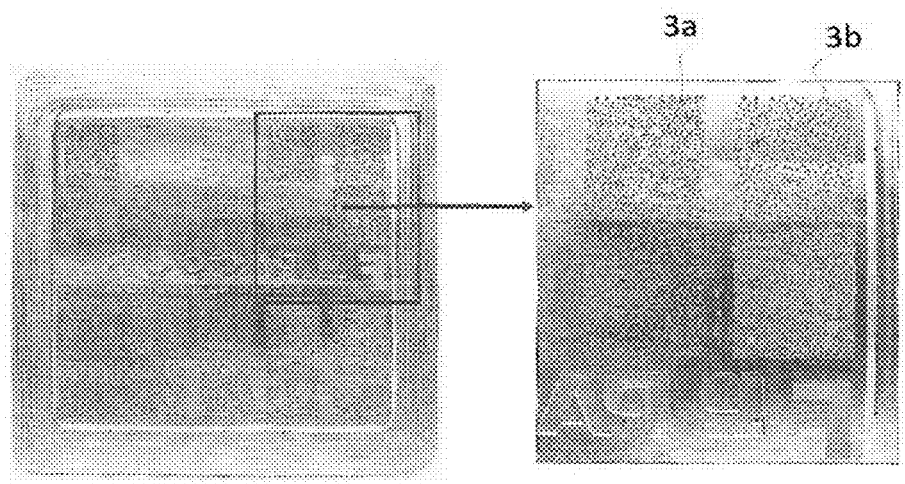
FIG. 2 is the image of a bottom region of the packaging container according to the invention having the encoding according to the invention.

The distribution of the watermarks can, for example, be such that a packaging container having a substantially square base shape has square digital watermarks on each lateral wall surface. On the underside thereof, i.e. the bottom surface, there could be two somewhat larger digital watermarks or even four watermarks, as shown in FIG. 2.

The spacing for digital watermarks of this type could be designed, for example, in the lateral wall surface region in such a way that there is only a narrow margin of 2-5 mm between each digital watermark. The watermarks could be arranged in a square shape having an edge length of, for example, 10-30 mm not only next to one another, but also in two or three rows one above the other on the lateral wall surfaces.

Alternatively, instead of distributing individual watermarks over a side wall surface and/or a bottom surface, a full-surface application of the watermarks over an entire side wall surface or an entire bottom surface or simply over all wall and bottom surfaces can also be selected. Depending on the geometry of the packaging, this should be done in such a way that reading out does not become impossible, particularly in the edge and corner regions. During a read-out process of the watermark in a recycling system, only a small portion of the total area of the watermark then has to be read out or found by the reading system.

Figure 3:
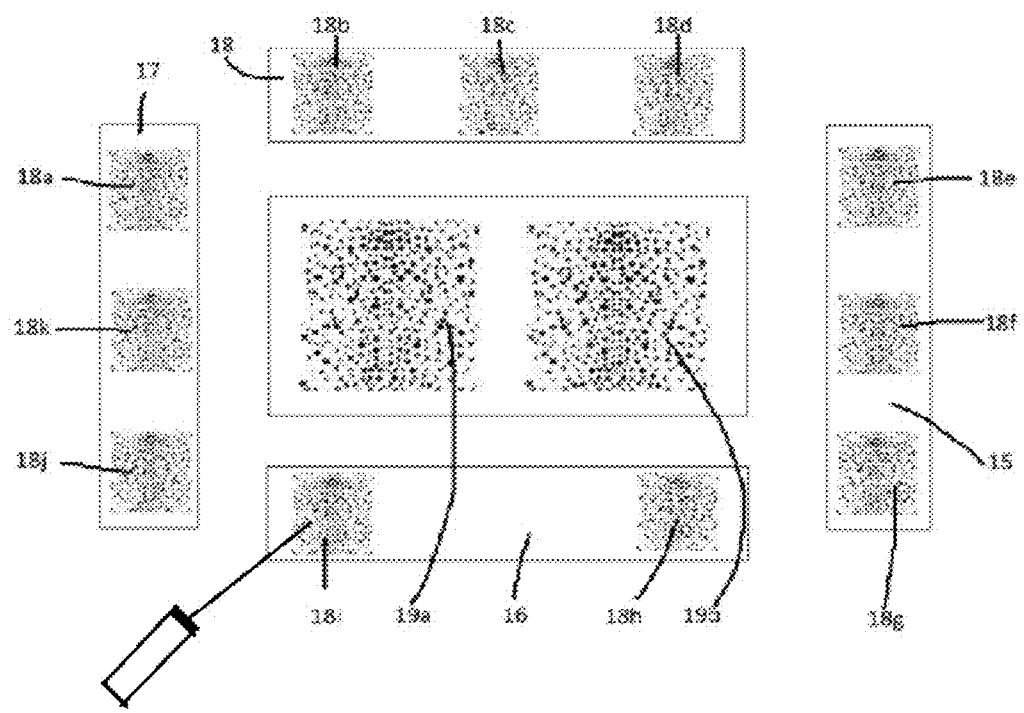
FIG. 3 is a top view of various tool mold inserts for producing three-dimensional codes on the outer surface of a packaging container in accordance with the method according to the invention.

FIG. 3 is a top view of a tool mold insert which has applied or incorporated 3D codes 18a-18k in accordance with the method according to the invention. The tool mold insert is represented in an imaginary opened-out form for a better view, so that all the inner sides and the inner bottom region can be seen separately from one another in this top view. A laser device 4 having laser beams 4a can be designed in such a way that many small dots are arranged at different locations, for example in the form of a square, these dots containing specific information on the basis of their arrangement position and on the basis of their depth in the material in the region of the surfaces.

Square encodings of this type can be used as a pattern in the tool mold shown in this case, for example along the lateral wall region, which is formed by the mold insert side surfaces 15, 16, 17 and 18, and are thus later responsible for the lateral wall surfaces of the finished packaging container. These three-dimensional code patterns can be arranged with the same or different spacings and also in different sizes. This is represented by the 3D codes 18a, 18b, 18c, 18d, 18e-k.

Additionally or alternatively, digital watermarks can also be arranged in the region of the future bottom surface of the packaging container. This is achieved in that the mold insert bottom surface 19 assigned to the bottom surface has, for example, incorporated three-dimensional codes 19a and 19b, which in turn can be designed as digital watermarks. These can, for example, have a larger side length of a square in terms of their size than the codes 18a-k. These digital watermarks arranged on the bottom are denoted by the reference signs 19a, 19b.

Figure 4:
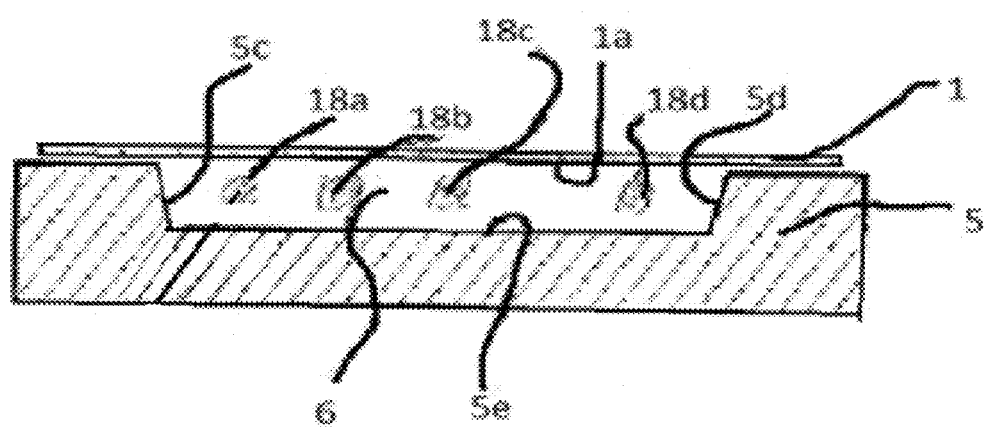
FIG. 4 is a lateral cross-sectional view of a deep-drawing mold having the plate-shaped, flat base material in an encoded form according to the invention.

FIG. 4 is a cross-sectional view of a deep-drawing mold 5 having a negative recess 6, this negative recess 6 representing the outer shape of the packaging container that is to be deep-drawn.

The plate-shaped, flat plastics material is placed with the first side 1a thereof upside down on the deep-drawing mold 5.

Figure 5:
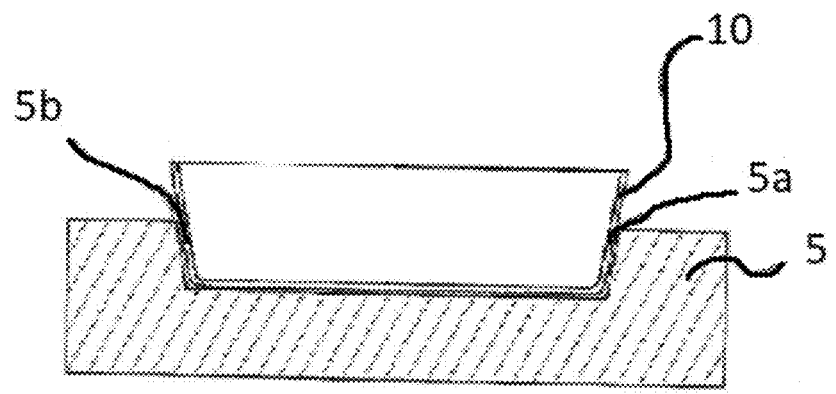
FIG. 5 is a cross-sectional view of the mold having the plastics material in an encoded form according to the invention.

Then, as shown in FIG. 5, the actual deep-drawing process takes place. In this case, the plate-shaped plastics material 1 is pressed into the recess 6 of the mold by underpressure or also by overpressure or a punch acting from above, in that the material is pulled downwards along the edges 5a and 5b. Care must be taken that the outer surface of the packaging container to be produced is not damaged. In the case of downward drawing or deep-drawing of the plastics material 1, the resulting lateral surfaces 12a, 12b, 12c and a bottom surface 11 and, if necessary, other surfaces of the packaging container are pressed against the lateral inner walls of the tool mold at the same time; these walls as well as the bottom surface of the tool mold may be provided with mold insert side surfaces and mold insert bottom surfaces 15, 16, 17, 18 and 19, as they were shown in FIG. 3. These mold insert surfaces, in turn, are characterized—as already described—by targeted minimal depressions in the plate material, which can be metal, for showing the 3-D codes. These codes then shape an outer surface of the future packaging container during the deep-drawing process in such a way that the code is transferred to the outer surface, but still remains almost invisible due to the small extent in three dimensions into the third dimension.

The inner sides of the tool mold or the mold insert surfaces (not shown in this case) within the tool mold are denoted by 5c, 5d and the bottom region is denoted by 5e.

Figure 6:
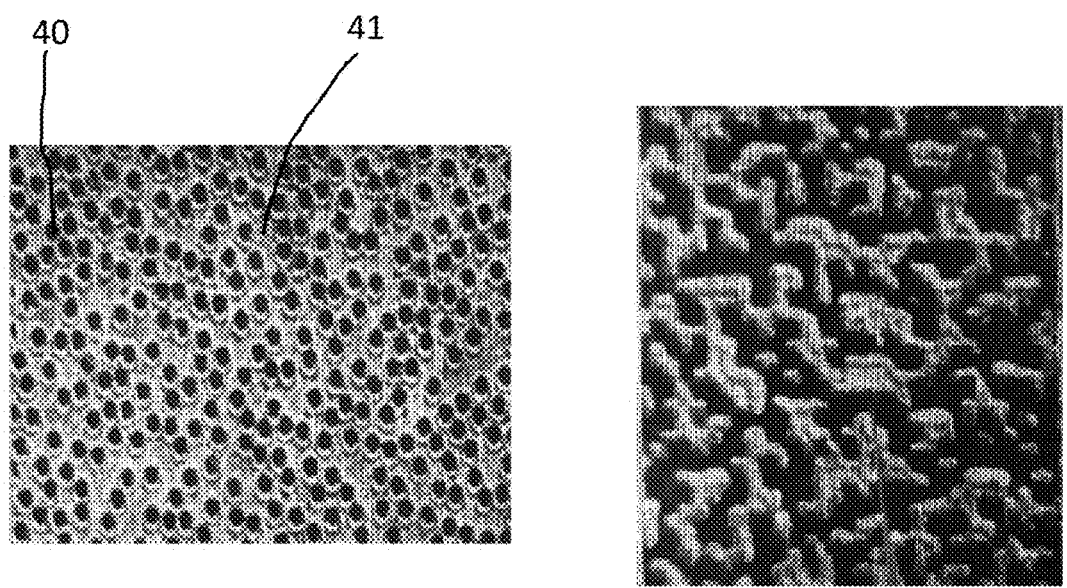
FIG. 6 is a microscope image of a section of a three-dimensional code, as it has been introduced in accordance with the method according to the invention on a surface of the tool mold in the inner region or on the inserts thereof.

In FIG. 6, a microscopic detail view is shown of a region of applied three-dimensional codes on the inner side of the tool mold made of metal or on metal inserts that are inserted into the tool mold. It can be seen from this view that there are minimal dot-like depressions 40 having a specific depth, for example in the range of 1-200 μm, preferably 5-50 μm. Unchanged regions 41 are present between these punctiform depressions which, in the case of a two-dimensional code, would have to be assigned to the white area portion between black dots.

Since the metal inserts or inner sides of the tool mold themselves now have depressions on the surfaces thereof, the first surfaces of the outer surfaces of the packaging container to be produced, i.e. the lateral wall surfaces and the underside of the packaging container, receive elevations at these points during the subsequent deep-drawing process of a plastics material into the tool mold in order to thereby obtain a digital watermark on the first surfaces of the outer surfaces and the bottom surface of the packaging container. Elevations of this type can range from 1 to 30 μm. In relation to a total wall thickness of the lateral wall surfaces and also the bottom surface, these elevations are extremely small and therefore hardly perceptible. Usual wall thicknesses, which depend on the geometry of the product, for example the shape of a drinking cup or the shape of a tray, are namely 250 μm-600 μm, preferably 300 μm-500 μm. In addition, the wall thicknesses depend on the plastics material used and on the position on the outer surface since, during the deep-drawing process, the wall thickness in the upper region of the container obtained in this way is usually greater than in the middle region of the side walls. The wall thickness then increases again towards the corner radii of the container. In the lower region, which is adjacent to the bottom surface, as well as in the bottom surface region itself, a wall thickness is provided that is close to the initial thickness of the film-like material, depending on the deep-drawing ratio, the punch geometry, the product contour, etc. In addition, the type of digital watermark or digicode can also influence the wall thickness structure with regard to the wall surfaces.

On the right-hand side of this view according to FIG. 6, another possible embodiment of a code, as it can be introduced into the metal surfaces by means of a laser device, can also be seen. This form of code is often seen on QR codes.

Figure 7:
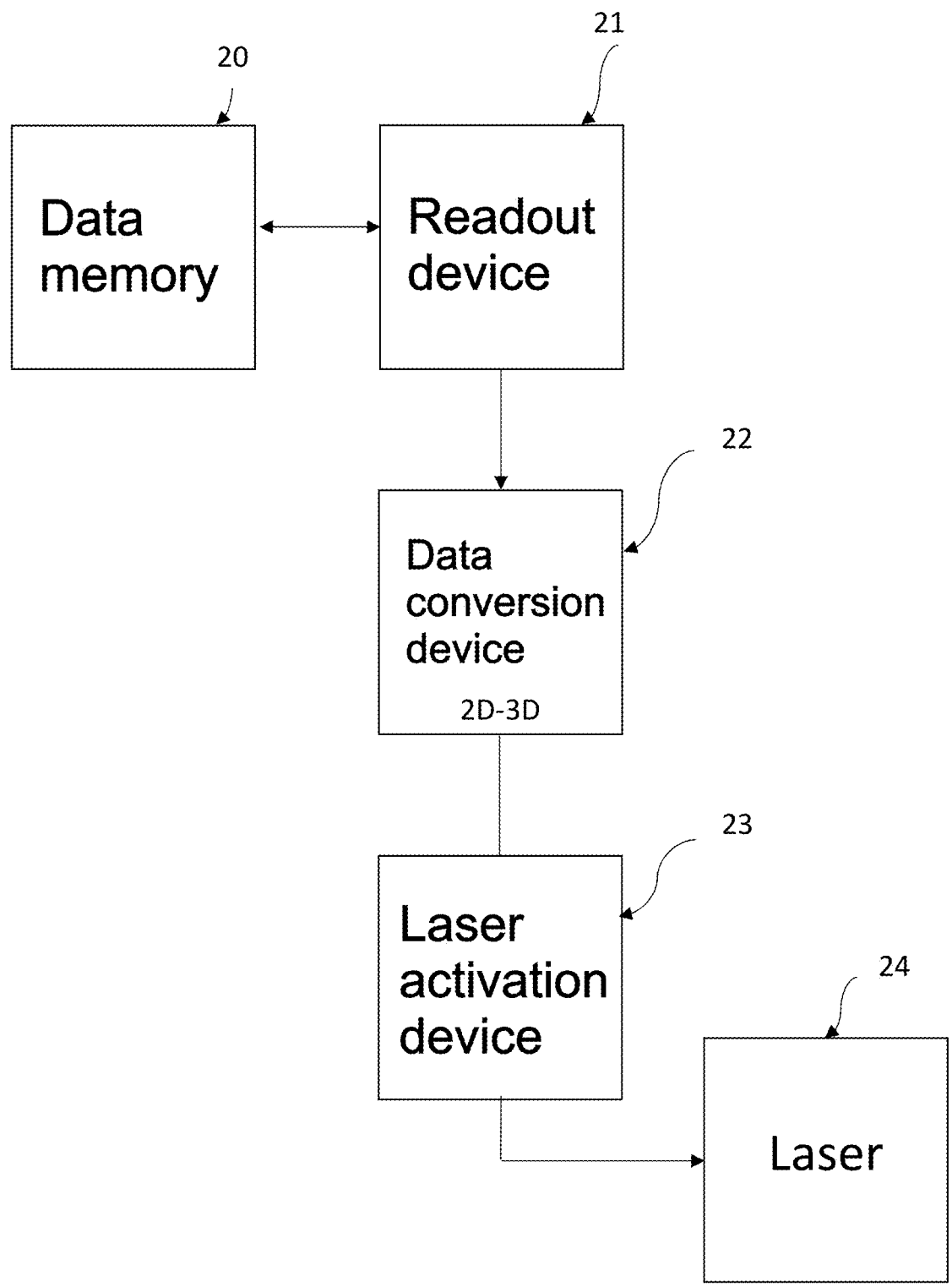
FIG. 7 is a schematic view of various devices for converting and introducing coding data by means of a laser device in accordance with the method according to the invention.

In FIG. 7, the conversion of two-dimensional stored code data into three-dimensional code data is represented again briefly in a method sequence, corresponding to the method according to the invention.

Data relating to a two-dimensional code, as generated, for example, by code generating devices, are stored. A read-out device 21 accesses this data memory 20, which reads out the data from the data memory after the start of a laser treatment process and forwards them to a data conversion device 22. This is intended to bring about a conversion of the previously available electronic two-dimensional data for a two-dimensional code pattern into data for a three-dimensional code pattern. This means that dark and light regions in the two-dimensional code pattern are converted into area portions of different depths within the surface of a tool mold or associated mold inserts.

A laser activation device 23 then receives an activation command in order to then introduce the data of the three-dimensional code pattern into the surface tool mold or the tool mold inserts with the aid of a laser device 24.

LIST OF REFERENCE SIGNS

1 Plate-shaped, flat plastics material
1a Side
2a Three-dimensional codes, digital watermarks
2b Three-dimensional codes, digital watermarks
2c Three-dimensional codes, digital watermarks
2d Three-dimensional codes, digital watermarks
3a Three-dimensional codes, digital watermarks
3b Three-dimensional codes, digital watermarks
4 Laser device
4a Laser beams
5 Tool mold, deep-drawing mold
5a Edge
5b Edge
5c Plate insert, mold insert within the tool mold
5d Plate insert, mold insert within the tool mold
5e Bottom surface of the tool mold
6 Negative recess
10 Packaging container
11 Bottom surface
12a Front lateral wall surface/outer side
12b Right lateral wall surface/outer side
12c Left lateral wall surface/outer side
15 Mold insert side surface
16 Mold insert side surface
17 Mold insert side surface
18 Mold insert side surface
18a Three-dimensional code pattern
18b Three-dimensional code pattern
18c Three-dimensional code pattern
18d Three-dimensional code pattern
18e Three-dimensional code pattern
18f Three-dimensional code pattern
18g Three-dimensional code pattern
18h Three-dimensional code pattern
18i Three-dimensional code pattern
18j Three-dimensional code pattern
18k Three-dimensional code pattern
19 Mold insert bottom surface
19a Digital watermark arranged on the bottom side
19b Digital watermark arranged on the bottom side
20 Data memory
21 Read-out device
22 Data conversion device
23 Laser activation device
24 Laser device
40 Surface depressions
41 Surface elevations While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. Method for encoding a dimensionally stable packaging container or an associated constituent made of plastics material, wherein the packaging container is suitable for storing consumer goods, characterized in that
   a film-shaped, flat plastics material for forming the three-dimensional packaging container or the associated constituent is deep-drawn using a tool mold while, at a plurality of positions, the outer sides or the inner sides thereof undergo a first shape-changing treatment acting on the first surface thereof for producing a plurality of three-dimensional codes,
   wherein in a preceding method step, data from at least one two-dimensional code pattern are converted by means of a data conversion device into data of a three-dimensional code pattern, taking into account a contour of the packaging container or the associated constituent, and
   wherein the three-dimensional code pattern is incorporated into second surfaces of the tool mold or mold inserts that can be arranged therein by means of a device for a non-contact processing method, in such a way that, during a second shape-changing treatment, the surface depressions and/or surface elevations are contained in the second surface in the form of tiny dots or other tiny cross-sectional areas.

2. Method according to claim 1, characterized in that:
   the device for contact-free processing method is a laser device; and
   the laser device heats the second surfaces at specific points using one or more laser beams and causes them to ablate, in particular to melt.

3. Method according to claim 2, characterized in that:
   the surface depressions and/or surface elevations resulting from the second shape-changing treatment are designed to be complementary to the surface depressions and/or surface elevations resulting from the first shape-changing treatment.

4. Method according to claim 3, characterized in that:
   the surface depressions and/or surface elevations resulting from the second shape-changing treatment are designed to be complementary to the surface depressions and/or surface elevations resulting from the first shape-changing treatment.

5. Method according to claim 1, characterized in that:
the plurality of three-dimensional codes on the packaging container represent a plurality of repeating, preferably identical digital watermarks, the existence of which is almost invisible or visible to the viewer.

6. Method according to claim 5, characterized in that:
the digital watermarks each consist of preferably rectangular, in particular square, arrangements of irregularly distributed, tiny dots in a two-dimensional view and/or other surface patterns and, if necessary, distorted adapted to the contour of the packaging container or the constituent, it being possible for the square arrangements to have different sizes on the same packaging container.

7. Method according to claim 5, characterized in that:
the plurality of digital watermarks can contain encoded information on the composition of the plastics material used, the production method, packaging container, content information, GTIN numbers, SKU numbers and information for the consumer and/or the user, also for further use for an identification method in a sorting, separation and recycling method.

8. Method according to claim 5, characterized in that:
the plurality of digital watermarks can contain encoded information on the composition of the plastics material used, the production method, packaging container, content information, GTIN numbers, SKU numbers and information for the consumer and/or the user, also for further use for an identification method in a sorting, separation and recycling method.

9. Method according to claim 1, characterized in that:
the positions of the plurality of three-dimensional codes are selected in such a way that they are distributed on outer wall surfaces and/or inner wall surfaces and/or on an outer bottom surface of the deep-drawn packaging container and/or on lid mirrors, lid edges, and/or lid aprons of a lid of the packaging container.

10. Packaging container made of dimensionally stable plastics material, which packaging container is suitable for storing consumer goods, characterized in that:
wall surfaces and/or a bottom surface of the packaging container have a plurality of digital watermarks which are almost invisible or visible to the viewer and which are applied at a plurality of positions,
wherein the packaging container is produced by a method according to claim 1.

11. Packaging container according to claim 10, characterized in that:
the digital watermarks are rectangular, preferably square, and are distributed over the packaging container with the same or different size dimensions.

* * * * *